March 18, 1969  J. L. MYERS  3,433,886
RECESSIBLE ELECTRICAL SERVICE DEVICE
Filed May 25, 1966  Sheet 1 of 2
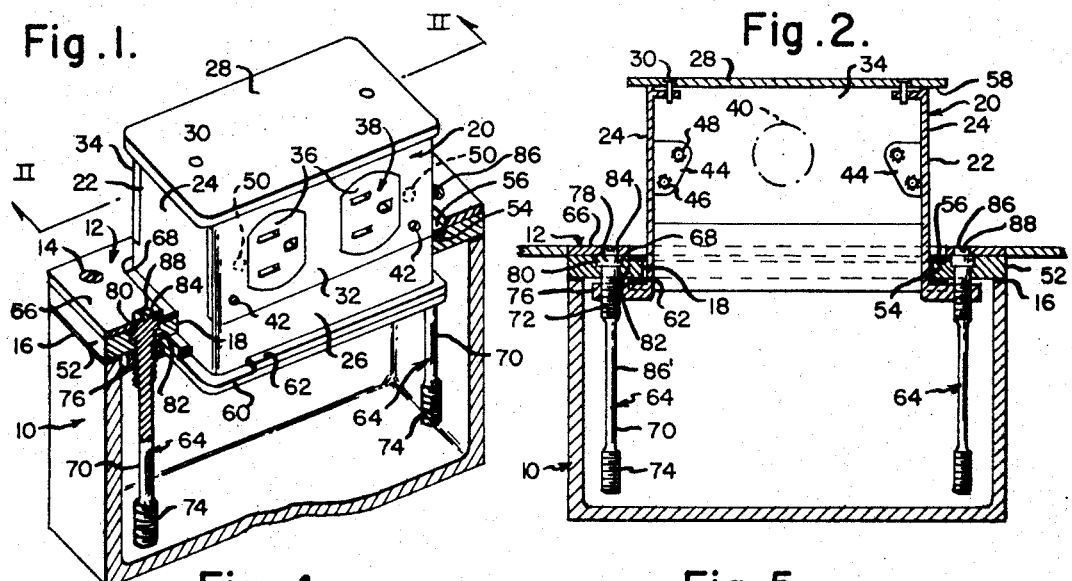
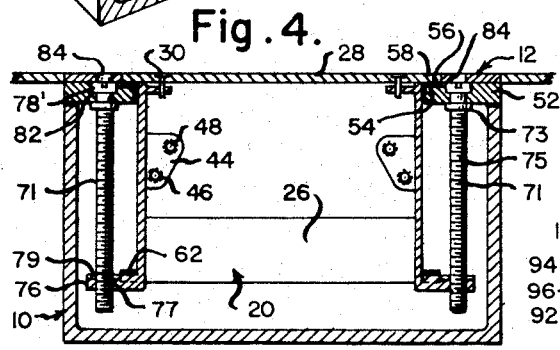
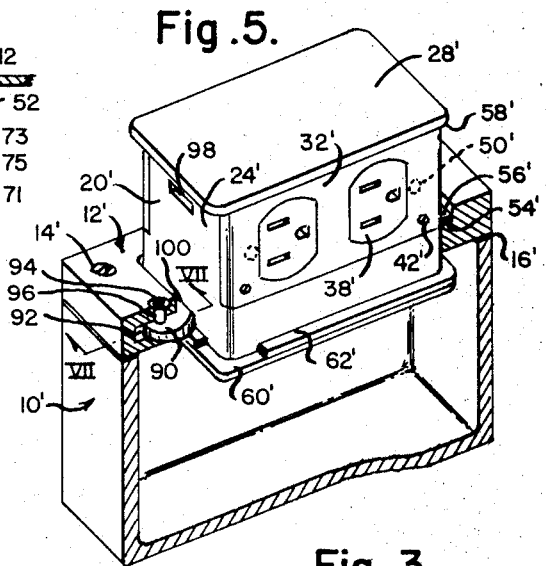
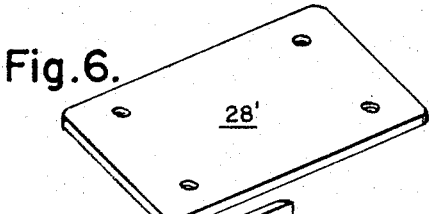
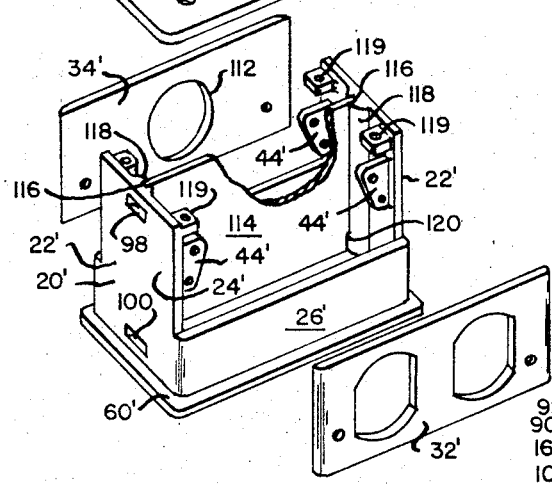
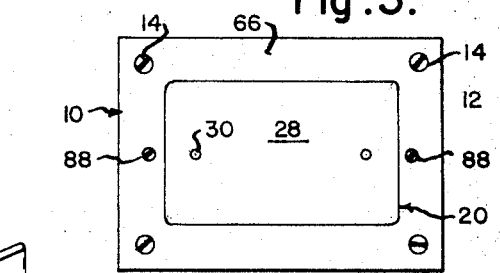
INVENTOR
John Leonard Myers

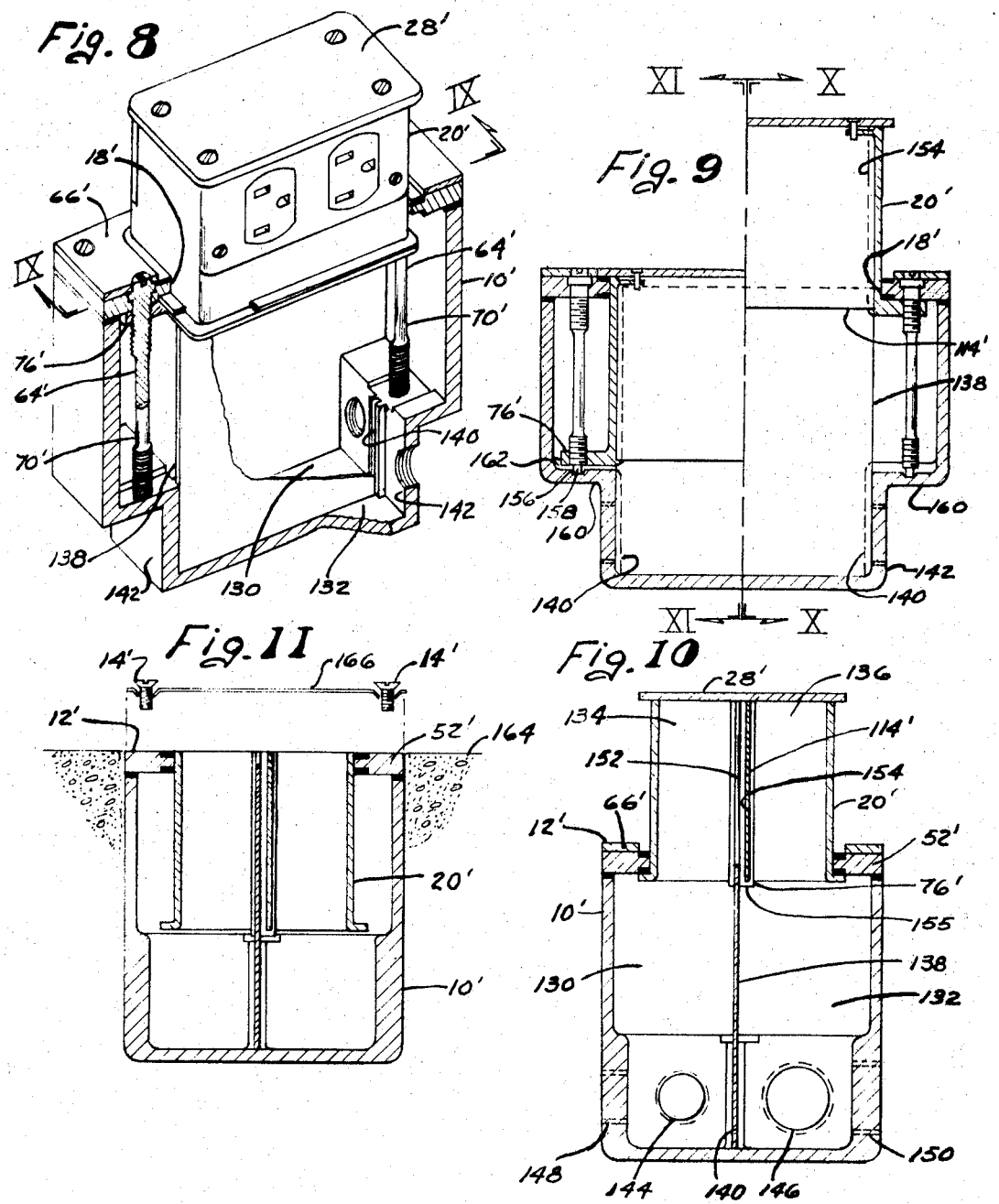

United States Patent Office 3,433,886
Patented Mar. 18, 1969

3,433,886
RECESSIBLE ELECTRICAL SERVICE DEVICE
John Leonard Myers, Leetsdale, Pa., assignor to H. K. Porter Company, Inc., Pittsburgh, Pa., a corporation of Pennsylvania
Filed May 25, 1966, Ser. No. 552,752
U.S. Cl. 174—57    17 Claims
Int. Cl. H01r 13/46; H01h 9/02

ABSTRACT OF THE DISCLOSURE

In a recessible electric service device, the combination comprising an electrical junction box arranged for flush-mounting in a building structure, an apertured cover member for said junction box, a recessible service box closely fitted for sliding movement within said aperture, means for moving said service box within said aperture to recess and to withdraw said service box relative to said junction box, flanges on said service box on each side respectively of said cover member, and means for sealing said service box to said junction box in said withdrawn position and in said recessed position of said service box.

---

My invention relates to a floor box type electrical service and more particularly to a service of the type described which can be readily sealed and stored when not in use.

Heretofore, many types of electrical floor box fittings or services have been proposed. Such services usually consist of a hinged cover and a round or rectangular receptacle box or fitting projecting above the surface of the floor level. Even in those cases where the box is recessed into the floor the open cover thereof presents a tripping hazard. Moreover, if the cover of the conventional service fitting is not first closed and sealed, an electrical hazard is presented when the floors are scrubbed. When these conventional services are being utilized, there is usually no provision for sealing or in any way shielding the wiring device or the like contained therein from entry of dirt, water, or other foreign matter. This is especially true in the case of a flush mounted floor service box where the cover has not been replaced prior to scrubbing or otherwise cleaning the floor. In the conventional flush mounted service, the plug-in is easily damaged or kicked out as by tramping, moving furniture, etc.

An attempt has been made to solve some of those problems, particularly in the case of large floor areas such as convention halls or large office areas by permanently installing a number of electrical raceways in or beneath the floor structure and then installing and later removing conventional upright horizontal or vertical service fittings at selected locations along the raceways. Such fittings introduce a tripping hazard, of course, but are sufficiently strong so as not to be damaged by tramping or by the moving of relative heavy furniture and the like. Moreover, as the electrical connections are made at a side surface thereof, they are less likely to be damaged in use. Although such fixtures are efficient for their application, their installation is very expensive in that considerable labor is involved in opening the raceways, making electrical connections thereto and to the projecting fittings, installing the fittings at the electrical raceways, and refinishing the adjacent floor areas. This procedure unfortunately must be repeated for removal of the service fittings, when no longer needed, as when the furnishings and/or the utilization of the floor space are completely changed. Therefore, it can be seen readily that considerable expense and labor are entailed.

I overcome these problems by providing an electrical junction box which can be mounted flushly in a building structure such as a floor, a recessible service fitting or receptacle box which can be recessed in the junction box when the service fitting is not in use, or withdrawn therefrom when electrical service connections are to be made thereto. Locking and/or sealing means are associated with the junction box and the service fitting box and are arranged for locking or sealing the service box to the junction box in a fixed position relative to the junction box. With this arrangement, an adequate number of the service fittings and junction boxes can be spotted at appropriate locations about a large floor area and permanently connected to suitable electrical raceways therefor. When the need for one or more of the service fittings is terminated, they need not be thereafter removed inasmuch as they can be recessed and locked and/or sealed in this position, which is flush with the surrounding floor area. Since the service fittings can be sealed to their associated junction boxes they can be permitted to remain in the floor structure, indefinitely, until a future need arises for their use.

I further provide, in certain applications, for the installation of multiple electrical receptacles or other wiring devices of the same or different character within the recessible service box. In those cases where the multiple services involve respectively the use of high and low electric potentials within the service fitting, I contemplate means for dividing or partitioning the service fitting or otherwise electrically insulating or shielding such high and low potentials.

It is further contemplated that my aforementioned locking and sealing means can be readily operated by the man in the street, i.e., by one not particularly skilled in the art, and with the use of simple hand tools. In one arrangement of my recessible service fitting, the aforesaid locking and sealing means are also utilized in initially lowering and in raising the recessible receptacle box to eliminate the need for the use of additional tools for prying or otherwise withdrawing the cover or otherwise unsealing the electrical service prior to use thereof. Such locking and sealing means are further arranged to afford quick and facile raising and recessing of the receptacle box of my invention.

Other details, objects, and advantages of the invention will become apparent as the following description of certain presently preferred embodiments thereof proceeds.

In the accompanying drawings, I have shown certain presently preferred embodiments of the invention wherein:

FIGURE 1 is a top and side isometric view, partially sectioned, of one form of recessible electrical service shown in raised operating position and embodying the invention;

FIGURE 2 is a vertically sectional view of the box shown in FIGURE 1 and taken along reference line II—II of FIGURE 1;

FIGURE 3 is a top plan view of the recessible service shown in FIGURES 1 and 2;

FIGURE 4 is a vertically sectional view of another form of the recessible service, in that modified raising and lowering means are employed;

FIGURE 5 is a top and side isometric view, partially sectioned and broken away, of another form of the electrical service device of the invention, shown here in its fully withdrawn or operative position;

FIGURE 6 is a top and side isometric view, partially exploded and partially broken away of one form of recessing portion which can be employed as part of the recessible electrical service shown in FIGURE 5;

FIGURE 7 is a partial, sectional view of the recessible service device illustrated in FIGURE 5 and taken along partial reference plane VII—VII thereof;

FIGURE 8 is an isometric view, partially sectional and partially broken away, of another form of the recessible service device arranged in accordance with the invention;

FIGURE 9 is a sectional view of the apparatus as shown in FIGURE 8 taken generally along reference line IX—IX thereof and illustrating both recessed and extended positions of the device;

FIGURE 10 is another cross-sectional view of the apparatus as shown in FIGURE 9 and taken along reference line X—X thereof to illustrate the extended position; and FIGURE 11 is a cross-sectional view of the apparatus as shown in FIGURE 9 and taken along reference line XI—XI thereof to illustrate the recessed position.

Referring now more particularly to FIGURES 1 to 4 of the drawings, the exemplary form of the invention illustrated therein comprises a flush mountable junction box denoted generally by reference character 10 and having a composite, apertured cover 12 secured thereto as by a number of appropriately located mounting screws 14.

Desirably, the apertured cover 12 is sealed to the junction box 10 by means of a gasket 16 extending contingently with the adjoining surfaces of the box 10 and the cover 12 and clamped therebetween, when the mounting screws are tightened. Mounted for vertical sliding movement within the apertured 18 of the cover is a recessible electrical service or receptacle box, which is shown here in its extended positon in FIGURES 1 and 2 and its recessed position in FIGURES 3 and 4, denoted generally by reference character 20. The recessible box 20 includes desirably an integrally molded wall structure 22 having, in this example, full length end wall portions 24 and cut away side wall portions 26. A top cover plate or blank 28 is secured to the end walls 24 by means of mounting screws 30.

The cut away portions of the side walls 26 are closed by a pair of side cover plates 32 and 34. The side plates 32 and 34 can be shaped or apertured to provide access to the desired electrical service or wiring device associated therewith. In this example, the side cover plate 32 is apertured to accommodate the crown portions 36 of a conventional duplex receptacle 38.

Depending upon the particular electrical services to be provided by the recessible service device, the other side cover 34 can be provided as a blank cover or non-apertured closure, but otherwise similar in contour to the aforedescribed cover 32. Alternatively, the other cover 34 can be apertured in the same manner as that depicted for the first described cover 32 in order to provide double duplex electrical service. Alternatively, again, the other cover 34 can be fabricated with a single aperture 40 to accommodate a different type of electric service, such as a simplex receptacle or other electrical service not inconsistent in code requirements. It is contemplated moreover, pursuant to my invention, that the aperture 40 can be made larger or smaller or gromated or otherwise appropriately arranged as required to accommodate such other electrical service, for example, a telephone, interoffice communication, or the like (not shown).

As better shown in FIGURE 1 of the drawings, each of the side covers 32 and 34 are secured, in this example, by a pair of mounting screws 42 threadingly engaging an adjacent pair of mounting brackets 44 secured adjacent the vertical or lateral edges of the end walls 24. The brackets 44 are each provided with a lower tapped aperture 46 to accommodate the side cover mounting screws 42 and with an upper tapped aperture 48 to accommodate similar mounting screws 50 of the duplex receptacle 38 or other conventional wiring device. Obviously, the upper tapped aperture 48 of each pair of opposed mounting brackets 44 are spaced so as to accommodate the yoke or other appropriate mounting member usually associated with conventional wiring devices or other electrical services. As better shown in FIGURE 2, two such mounting brackets 44 are utilized, in this example of the invention, with one pair thereof being employed in conjunction with each side cover 32 or 34 and the associated wiring device, if used.

As seen from the various figures of the drawings, the top cover 28 overhangs the side and end wall portions of the recessible box 20 for the sealing purposes described hereinafter, and also to serve as an overhanging eve structure, as it were, to minimize the entry of dirt and other foreign matter into the plug openings or the like associated with the aforementioned wiring device. Such entry is further minimized by the fact that such openings are disposed in a horizontal position, rather than in the vertical postion as in the usual floor-mounted electrical service.

In this arrangement of the invention, the apertured cover 12 of the floor mounted junction box 10 is a composite structure including, in this example, an annular body portion or member 52 defining the aforementioned opening 18 and closely fitted about the slidably mounted vertical floor structure 22 of the recessible box 20. A relatively narrow band extending adjacently and contingently about the aperture 18 is counter-sunk as denoted by the reference character 54 to receive a sealing gasket 56. As better shown in FIGURE 4, the sealing gasket 56 is engaged and compressed by the overhanging edges 58 of the recessible box cover 28, when the latter is in its recessed position. When in this position, means described hereinafter are provided for causing the top cover 28 to engage compressingly the gasket 56 to afford an effective water and dirt seal for the recessible electrical service device in its collapsed or recessed position.

Similarly, the recessible box 20 is sealed in its active or raised position, as shown in FIGURES 1 and 2, by means of a peripherally and outwardly extending flange 60 secured, in this example, to the bottom edges of the wall structure 22. The peripheral flange 60 cooperates with the juxtaposed edges of the junction box cover aperture 18 to prevent removal of the recessible box 20 therefrom and to seal the recessible electrical service device in its withdrawn or active position by compressing a second peripheral gasket 62 therebetween. The raised and lowered positions of the recessible box 20, therefore, are defined respectively by the bottom peripheral flange 60 and by the overhanging edges 58 of the recessible box cover 28.

Readily manipulatible means are provided by my invention for raising and lowering the recessible box structure 20 between these positions and for compressing and locking together the adjacent engaging portions of the box structure 20 and the associated one of the sealing gaskets 54 and 62 at these positions.

Returning now to the composite cover structure 12 and associated mechanisms, one form of such compressing and locking means, in this example, is also employed in withdrawing and recessing the service box 20. This form of locking means, identified hereinafter as the recessing means of my invention, will now be described. Such recessing means, designated in FIGURES 1 to 3 by the reference characters 64, are retained or captivated in the composite cover structure 12 by means of an annular retaining plate 66 having a central aperture 68 therein. The aperture 68 is contoured so as to be similar to the aperture 18 of the cover body member 52 and is further congruent with the outer peripheral extremity of the gasket receiving counter-sunk portion 54. With this arrangement, the aperture 58 of the retaining plate 56 flushly and close-fittingly receives the cover 28 of the recessible box 22, when the latter is in its recessed or inactive position. The retaining plate 66 is secured with the cover body member 52 to the junction box 10 by means of the aforementioned mounting screws 14.

Adjacent each end wall 24 of the recessible box 20, the composite cover structure 12 supports and retains the aforementioned recessing means 64. In this arrangement of my invention, the recessing means 64 includes an elongated vertically disposed machine screw 70 having spaced upper and lower threaded portions 72 and 74. Each of the threaded portions 72 and 74 are threadedly engageable with a tapped supporting bracket 76 integrally molded with the recessible box wall structure 22, or otherwise secured at each end thereof as better shown in FIGURE 2 of the drawings.

The head 78 of the machine screw 70, in this example, is provided with a peripheral outwardly extending flange 80 which is seated in a counter-sunk aperture 82 at each end of the composite cover body member 52. The head flange 80 thus is seated flushly within the counter-sunk aperture 82 and is retained therein by the overlying edges of the associated aperture 84 in the retaining plate 66. Desirably, a portion of the screw head 78 extends flushly through the retaining plate aperture 84 as denoted by the reference character 86, and is provided with a screw driver slot 88 or other tool manipulating means.

This arrangement is particularly advantageous in preventing the accumulation of dirt in the retaining plate aperture 84. However, where dirt conditions are not severe machine screws 71, in accord with another form of the invention, can be provided with an ordinary, round head 78', which likewise can be seated in the counter-sunk aperture 82 of the cover 12, as shown in FIGURE 4 of the drawings. In the latter arrangement, the adjacent edges of the retaining plate apertures 84 partially overlie the round machine screw heads 78' for retention purposes and to permit the insertion of a screw driver therethrough to manipulate the machine screws 71. To prevent removal of the screws 71 from the cover 12, as during assembly or installation of the device, cardboard or metallic washers 73 can be threaded to the upper limits of the threaded portions 75 of the screws 71, where the washers more or less loosely engage the underside of the cover 12. The loose engagement therewith prevents binding when the screws 71 are subsequently turned for raising and lowering the recessible box 20 relative to the junction box 10. The brackets 76 of the recessible box 20 are shouldered or stepped down (or alternatively, counter-sunk about their threaded apertures 77) as denoted by reference character 79, to accommodate the thickness of the washers 73, when the box gasket 62 is sealingly compressed against the undersurface of the cover 12 at the fully withdrawn position of the recessible box 20. It is also contemplated that the recessing screws 70 of FIGURES 1-3 can be similarly provided, at their upper threaded portions 72, with the aforementioned washers, if desired.

Returning now to FIGURES 1-3, the machine screws 70 when rotated in the clock-wise direction, tend to move the recessible box structure 20 upwardly, as viewed in FIGURES 1 and 2 of the drawings, by threaded engagement of the upper threaded portions 72 of the machine screws 70 with the supporting brackets 76 of the box structure 20 to apply compressive forces to the sealing gasket 62. Desirably, there is sufficient frictional engagement between the screw heads 78 and the engaging surfaces of the retaining plate 66 to prevent subsequent turning and loosening of the screws 70, as by vibration and the like. This frictional engagement thus serves to lock the recessing means 64 in the position shown in FIGURES 1 and 2 where it applies sealing forces to the gasket 62 for the positions mentioned previously.

When lowering the recessible box 20, the screws 70 are turned in the counter-clockwise direction until the threaded supporting brackets 76 of the recessible box 20 separate from the upper threaded portions 72, which then permits the recessible box 20 to drop downwardly through the distance represented by the intermediate necked-down and unthreaded portions 86' of the screws 70 where they engage respectively the lower threaded portions 74 of the screws 70. The latter screws are then further turned in the counter-clockwise direction to move the recessible box 20 further in the downward direction until the overhanging edges 58 of its top cover 28 compressingly engage the closed position sealing gasket 56 in much the same manner as that shown in FIGURE 4. The recessible box 20 thus is sealed and locked in its recessed or inactive position by frictional retainment of the screws 70, in the manner described above.

When raising the recessible box 20 from its last-described recessed or flush position, the screws 70 are again manipulated in the clock-wise direction thereby causing the lower threaded portions 74 to move the supporting brackets 76 and the recessible box 20 upwardly until the brackets 76 are disengaged from the threaded portions 74. At this point, the recessible box 20 has been raised a sufficient distance to permit the operator's fingers to be inserted under the overhanging portions 58 of the box cover 28 and to permit the service box 20 to quickly be raised for the major proportion of the recessing distance as defined by the intermediate or unthreaded portions 86 of the recessing screws 70. Thereafter, while the recessible box is temporarily held by the operator in engagement of its supporting brackets 76 with the lower ends respectively of the upper threaded portions 72, the screws 70 are further rotated in the clock-wise direction to permit threaded engagement of their upper threaded portions 72 with the brackets 76. Further rotation of the screw 70 in the clock-wise direction at this time continues to move the recessible box 20 upwardly through the short distance required to seat and seal the gasketed lower flange 60 thereof against the adjacent edge portions of the composite cover aperture 18.

In another embodiment of the recessing means of the invention, such as represented by the aforementioned screws 71 (FIGURE 4), the latter screw can be continuously threaded, as denoted by their threaded portions 75. In this arrangement the recessible box 20 is continuously controlled throughout its recessing and withdrawal movements by continued turning of the screws 71 in the clockwise direction to engage the recessible box sealing gasket 62 in the fully raised or withdrawn position of the recessible box 20, or in the counter-clockwise direction to engage the cover sealing gasket 56 at the fully lowered or recessed position of the box 20. It is contemplated, of course, that the recessing screws 70 (FIGURES 1-3) can be similarly provided with continuously threaded portions (not shown) in the event that the quick-raising and -lowering feature thread is not needed or required.

Referring now to FIGURES 5-7 of the drawings, another form of the recessible electrical service device of my invention is illustrated therein. In the modification of the invention, as shown in FIGURES 5-7, where similar reference characters with primed accents denote similar components of FIGURES 1 to 4 of the drawings, locking and sealing means are provided in the form of a pair of cam members 90 which are mounted for rotational movement in a recess 92 formed in each end portion of the cover 12'. The cam receiving recesses 92 are formed in the cover 12' below its overlying counter-sunk band 54' and the sealing gasket 56' seated therein so that the cam 90 can be manipulated without interfering with sealing engagement between the junction box cover gasket 56' and the recessible box cover 58' at the recessed position of the box 20'.

Each cam 90 is mounted on and threadedly secured to a limited thread, adjustment screw or stripper bolt 94, as better shown in FIGURE 7, which in turn is rotatably retained in a suitable aperture 96 therefor in the cover plate 12'. The junction box cover plate 12' is generally similar to the composite cover 12 of FIGURES 1 to 4 with the exception that the retaining plate 66 thereof is not required and the body member 52 of the cover is provided with a correspondingly deeper counter-sunk portion 54' so as to accommodate both the closed position sealing gasket 56' and the overhanging edges 58' of the recessible box cover 28'.

Cooperable with each associated cam 90 are a pair of notches 98 and 100 formed at spaced locations in each end wall structure 24' of the recessible box. The notches 98 and 100, therefore, determine the withdrawn and recessed positions, respectively, of the recessible box 20' relative to the junction box 10'. Each cam 90 preferably is provided with a wedge configuration (FIGURE 7) to form a thickened offset portion 102 which retainingly engages the selected one of the notches 98 and 100 so that the recessible box is moved through a small vertical distance upwardly when the offset portions 102 of the cams 90 are moved further into the notches 100 respectively, or downwardly when the cam offsets 102 similarly engage the upper notches 98 in order to apply compressive forces to the associated sealing gaskets 56' and 62' respectively. In furtherance of this purpose, the opposed sides 104 and 106 of each cam 90 are outwardly and thereby oppositely tapered adjacent particularly the aforementioned cam offset portion 102, as provided by the wedge contour of the cam. Thus, the upper tapered surface 104 of each cam cooperatively is engageable in the associated lower notch 100 while the lower tapered surface 106 of the cam is similarly engageable in the upper notch 98. These tapered surfaces 104 and 106 define the aforesaid thickened characteristic of the cam offset portion 102.

The recessible service box 20', in this arrangement of the invention, is more particularly adapted for the use of combined electrical services. For purposes of exemplifying this modification, it will be assumed that the front side cover 32' (as viewed in FIGURE 6) is adapted for use with a grounding type duplex receptacle 38', while on the other hand the rear side cover 34' accommodates in opening 112 a simplex receptacle (not shown) of the three-wire variety or nominally 220 volts capacity. Because of the difference of potential, it is desirable at least in the more common applications and where required by applicable electrical codes, to partition the recessible box 20' (as better shown in FIG. 6) and thus to provide an electrically insulating or shielding member 114 between the high and low potential sections of the recessible service box 20'. This is accomplished by inserting the partition member 114 in the opposed vertical grooves 116 formed respectively in end wall ribs 118, which can be formed on the inner surfaces of the end walls 24'. When thus inserted, the partition 114 serves as electrical insulation when fabricated from nonconductive material or as an electrical shield from conductive material and grounded in the usual manner. Accordingly, the member 114 may be termed an electrical partition member to denote either application thereof. Desirably the grooves 116 do not extend all the way to the lower ends of the wall ribs 118, so that stops 120 are formed by the remaining rib portions to prevent the electrical partition member 114 from dropping through the box 20'.

The top cover 28' of the recessible box 20' is secured, in this example, by a number of mounting screws inserted through apertures therefor in the corners of the cover 28' and engageable with tapped corner brackets 119, similarly arranged on the inner surfaces of the recessible wall structure 22'. This arrangement of mounting brackets 119 permits insertion of the electrical partition member 114 therebetween. Disposed immediately below the brackets 119 are the side cover brackets 44' respectively which have been described heretofore.

In order to afford more or less universal usage of the recessible box 20' a variety of replaceable side covers of similar outer contours can be provided for securance in the aforestated manner to the side wall structure 22'. Such replaceable side covers can be formed with differing adaptive apertures or the like for accommodating the related wiring devices or other electrical service items to be utilized therewith. For example, a side cover plate can be provided with the usual, rectangular switch slot (not shown).

It is further contemplated that the partitioned service box 20' can be provided with the tapped supporting brackets 76 in order to adapt the partitioned box 20' for use in the electrical service devices of FIGURES 1–3 and FIGURE 4, respectively. Similarly, the electrical partition member 114 of the cam actuated service box 20' can be omitted. The removable partition and associated member 114 on the other hand, can be supplied with each such box 20 or 20' and discarded when not required for a particular application. In the latter case each such box 20 or 20' will be fabricated with the grooved structure 116–120, or the like, for optional use of the electrical partition member.

With reference now to FIGURES 8 to 11 of the drawings an arrangement for partitioning both the junction box 10' and the recessible service box 20' is illustrated, wherein similar reference characters with primed accents denote similar components of the preceding figures. The latter arrangement of the invention is particularly useful where the recessible service is used to accommodate circuits of both high and low potentials which are segregated into compartments 130 and 132 within the junction box 10' and into corresponding compartments 134 and 136 of the recessible service box 20' as better shown in FIGURES 8 and 10 of the drawings. The junction box compartments are separated by a partition plate 138 fitted in grooves 140 formed respectively in off-set side wall portions 142 of the junction box 10'. The compartments 130 and 132 thus formed in the junction box 10' desirably are provided with tapped connector apertures 144 and 146, respectively, formed in the off-set wall portions 142. Additional tapped apertures 148 and 150 can be formed in the straight wall portions of the junction box 10'. It will be understood, of course, that suitable knockouts or the like can be provided in place of the threaded apertures 144–150, depending upon the material and the manner in which the junction box 10' is formed.

The off-set wall portions 142 also serve to prevent electric conductors (not shown) which enter the apertures 144–150 from physically contacting the adjusting screws 70' to avoid any possibility of damage to conductor insulation and to prevent inadvertent insertion of the conductors under the edges of recessible box 20' when the latter is recessed.

As better shown in FIGURE 9, the off-set wall portions 142 are generally aligned with the inner end surfaces of the recessible box 20' through opening 18' so that the partition plate 138 can be fitted into the junction box 10' through the opening 18' in the composite cover plate 12'. Desirably, also, the width of the partition plate 138 is such that its lateral edges are seated in slots or grooves 152 which are formed on inner end surfaces of opposite wall portions of the recessible service box 20' and generally aligned with the junction box grooves 140. The recessible box 20' thus remains in engagement with the junction box partition plate 138 in all positions of the recessible box 20' with respect to the junction box 10'. In furtherance of this purpose, at the extended position of the recessible service box 20', the upper end portion of the barrier plate 138, as viewed in FIGURE 10 of the drawings, extends a short distance into the grooves 152.

Also as shown in FIGURE 10, the lower barrier plate 138 desirably is off-set slightly from the center line of the junction box 10', for the purpose of accommodating an upper barrier plate 114' which is likewise off-set slightly in the opposite direction from the center line of the recessible service box 20'. The upper barrier plate 114' is generally similar to that described in connection with FIGURE 6 of the drawings and is seated in grooves or slots 154 which are similarly formed on opposite wall portions of the recessible box 20'. Desirably, the slots 154 are spaced closely adjacent to the slots 152 therein for the reception of the lower barrier plate when the recessible box 20' is recesesd. As better shown in FIGURE 10 of the drawings, each groove 154 terminates short, as denoted by reference character 155, of the lower surface of the associated screw bracket 76' to retain the upper partition plate 114'.

Referring now more particularly to FIGURES 8 and 9 of the drawings, another function of the off-set wall portions 142, in addition to providing supporting means for the lower barrier plate 138, is to provide clearance for the recessing means 64' relative to the barrier plate 138 which in this example is generally aligned therewith. In this arrangement of the invention, the recessing means 64' are provided in the form of the partially threaded screws 70', which are described more particularly in FIGURES 1 and 2 of the drawings. It will be understood, of course, that the continuously threaded screws 71 of FIGURE 4 or the like can be substituted.

In any event, as better shown in FIGURE 9, the lower ends of the recessing means 64', as viewed therein, are provided with desirably unthreaded bearing extensions 156 which in turn are seated in recesses 158 formed respectively in offset wall portions 160. In this example, the lower wall surfaces of the box 10' (as viewed in FIGURE 9) are extended inwardly to form the off-sets 160, including upper shelf surfaces in which the recesses 158 are respectively located. The recesses 158 respectively retain the ends of the recessing screws 70' (or 71) and prevent misalignment and bending of the screws when manipulated to extend or recess the box 20'. A pocket or relatively broad groove 162 is formed on the inner surface on each of the offset wall portions 160 to accommodate the screw brackets 76', as better shown in the left-half of FIGURE 9, when the recessible box 20' is fully inserted into junction box 10'. The screw end recesses 158 are formed centrally in the bracket pockets 162, in this example.

The general alignment of the screws 70' with the lower barrier plate 138 effectively divide the entire junction box 10', in this example, into the aforementioned compartments 130, 132. As the service box 20' is extended or recessed the upper and lower barrier plates 114', and 138 are maintained in relatively closely spaced, parallel relationship by their grooves 154 and 140, 152 respectively (FIGURES 10 and 11). This arrangement maintains, in this example, the segregation of the entire recessible service including the junction box 10' and the recessible box 20' into a chamber on one side of the barriers 114', 138 including communicating compartments 130, 134 and a second chamber on the other side of the barriers including communicating compartments 132 and 136.

With reference now to FIGURE 11 of the drawings, one arrangement for installing the recessible service of the invention in a concrete floor or the like, is illustrated. When making such installation, in this arrangement of the invention, annular retaining plate 66 (FIGURE 10) forming part of the junction box cover plate 12' and the recessible box cover 28' (FIGURE 10) have been removed. The recessible service, with the remainder of the recessible box 20' fully inserted into junction box 10' is installed such that the upper surface of the annular body member 52' forming part of the junction box cover 12' is flushed with the concrete or other unfinished floor structure, as denoted by reference character 164. A relatively thin, non-apertured protector plate 166, save for its mounting screw apertures, is then temporarily secured to the recessible service in place of the retaining plate 66' by means of mounting screws 14'. The protector plate or shield 166 thus prevents foreign matter, and particularly particles of concrete mix in the case of a concrete floor, from entering the otherwise open service during construction. In the case of a concrete floor the concrete mix is screed flush with the upper surface of the cover member 52', and, after the mix has set-up, the protector plate 166 is removed and replaced with the recessible box cover 28' and the cover retaining plate 66'. In this example the cover 28' and the plate 66' are desirably of the same thickness and are equivalent to the thickness of the finished floor covering such as asphalt tile or the like.

From the foregoing it will be evident that novel and efficient forms of recessible electric serviced devices have been disclosed herein. While I have shown and described certain presently preferred embodiments of the invention, it is to be distinctly understood that the invention is not limited thereto but may be otherwise variously embodied and practiced within the scope of the following claims. Moreover, it is to be understood that certain features of the invention can be advantageously utilized without a corresponding use of features thereof.

I claim:

1. In a recessible electric service device, the combination comprising an electrical junction box arranged for flush-mounting in a building structure, an apertured cover member for said junction box, a recessible service box closely fitted for sliding movement within said aperture, means for moving said service box within said aperture to recess and to withdraw said service box relative to said junction box, flanges on said service box on each side respectively of said cover member, means for sealing said service box flanges to said junction box in said withdrawn position and in said recessed position of said service box, gasket means disposed between each of said flanges and the associated side of said cover member, and means for locking the associated one of said flanges and sealing means against said cover plate at the withdrawn position of said service box.

2. The combination according to claim 1 characterized in that means forming part of said locking means are provided for selectively compressing said gasket means between said flanges respectively and said cover plate.

3. The combination according to claim 1 characterized in that said locking means include a pair of cam members mounted respectively adjacent opposite sides of said service box and on said junction box cover, and said opposite sides each have a pair of spaced notches thereon cooperable with the associated one of said cam members to retain said service box in a selected one of said withdrawn and recessed positions.

4. The combination according to claim 3 characterized in that each of said cam members includes a pair of opposed tapered portions respectively engageable with said notches upon further rotation of said cam members to induce further withdrawing and recessing movements respectively of said service box in order to apply compressive forces to said gasket members.

5. The combination according to claim 1 characterized in that said locking means include a pair of screw members extending into said junction box and mounted for rotation in said junction box cover, said screw members being disposed adjacent the aperture of said cover and respectively adjacent opposite sides of said junction box, and a pair of tapped supporting brackets are secured to said service box and threadedly engageable with said screw members for withdrawing and recessing said service box and for retaining said service box in a selective one of said recessed and withdrawn positions.

6. The combination according to claim 5 characterized in that said screw members each includes spaced first and second threaded portions for engaging the associated one of said tapped brackets and an intermediate necked down unthreaded portion between said threaded portions to permit rapid withdrawing and recessing of said service box between said threaded portions.

7. In a recessible electric service device, the combination comprising an electrical junction box arranged for flush-mounting in a building structure, an apertured cover member for said junction box, a recessible service box closely fitted for sliding movement within said aperture, means for moving said service box within said aperture to recess and to withdraw said service box relative to said junction box, flanges on said service box on each side respectively of said cover member, means for sealing said service box flanges to said junction box in said withdrawn position and in said recessed position of said service box, said sealing means including spaced first and second outwardly and peripherally extending flanges secured to said service box and respectively juxtaposed to opposite sides of the adjacent peripheral edge portions of said cover aperture, gasket means disposed between said flanges respectively and associated sides of said peripheral edges, one of said flanges being formed by the overhanging edges of a top cover of said service box, said service box having replaceable side covers, aperture means in each of said side covers for accommodating a given type of wiring device, and a removable electrical partition member inserted in a pair of oppositely disposed grooves within said service box, said grooves and said partition being disposed generally between said wiring devices.

8. In a recessible electric service device, the combination comprising an electrical junction box arranged for flush-mounting in a building structure, an apertured cover member for said junction box, a recessible service box closely fitted for sliding movement within said aperture, means for moving said service box within said aperture to recess and to withdraw said service box relative to said junction box, flanges on said service box on each side respectively of said cover member, means for sealing said service box flanges to said junction box in said withdrawn position and in said recessed position of said service box, and a removable electrical partition member inserted in oppositely disposed groove means within said recessible service box to form a pair of segregated compartments within said service box.

9. In a recessible electric service device, the combination comprising an electrical junction box arranged for flush-mounting in a building structure, an apertured cover member for said junction box, a recessible service box closely fitted for sliding movement within said aperture, means for moving said service box within said aperture to recess and to withdraw said service box relative to said junction box, means for sealing said service box to said junction box in said withdrawn position and in said recessed position of said service box, said moving means including screw adjustment means extending into said junction box, and the adjacent wall portions of said junction box being shaped in an inwardly offset contour so as to be closely spaced from the ends of said screw means to prevent electrical conductors in said junction box from engaging the end of said screw means.

10. The combination according to claim 9 wherein an electrical partition member is removably inserted in oppositely disposed groove means formed on the opposed surfaces of said off-set wall portions, said groove means being generally aligned with said screw means to align said partition member therewith.

11. The combination according to claim 9 wherein said off-set wall portions include recess means engaging ends of said screw means to prevent misalignment and bending of the screw means during operation thereof.

12. In a recessible electric service device, the combination comprising an electrical junction box arranged for permanent mounting in a building structure in a flush position therein, a service fitting box slidably positioned in said junction box for movement relative thereto from a position substantially flush with said building structure to a position projecting outwardly thereof, a screw member rotatably mounted on said junction box and aligned with the path of movement of said service box, and a tapped supporting bracket secured to said service box and threadedly engaged with said screw member.

13. The combination according to claim 12 characterized in that means are provided for sealing said service box to said junction box at said outward and said flush positions of said service box.

14. The combination according to claim 13 characterized in that said sealing means includes spaced upper and lower outwardly extending flanges secured to said service box and respectively overlying and underlying the adjacent edge portions of said junction box and gasket means disposed between said flanges and said adjacent edges respectively.

15. The combination according to claim 12 wherein said screw member is provided with spaced first and second threaded portions for engaging said tapped brackets and an intermediate necked-down unthreaded portion between said threaded portions to permit rapid withdrawing and recessing of said service box between said threaded portions.

16. In a recessible electric service device, the combination comprising an electrical junction box arranged for flush-mounting in a building structure, an apertured cover member for said junction box, a recessible service box closely fitted for sliding movement within said aperture, means for moving said service box within said aperture to recess and to withdraw said service box relative to said junction box, means for sealing said service box to said junction box in said withdrawn position and in said recessed position of said service box, an electrical partition member removably inserted in oppositely disposed groove means within said junction box to divide said junction box into a pair of segregated compartments, a second electrical partition member mounted in said service device, said second partition member being removably inserted in oppositely disposed groove means within said recessible service box, said first-mentioned and second partition members being disposed generally parallel to one another and closely but laterally spaced for side-by-side relative movement when said service is recessed and withdrawn relative to said junction box, said partition members together dividing said service device into a pair of segregated chambers, each chamber being formed from communicating compartments in said junction box and said service box respectively.

17. In a recessible electric service device, the combination comprising an electrical junction box arranged for permanent mounting in a building structure in a substantially flush position therein, a service fitting box slidably positioned in said junction box for movement relative thereto from a position substantially flush with said building structure to a position projecting outwardly thereof, a cam member mounted on said junction box adjacent a side surface of said service box, and said side surface having a pair of spaced notches thereon cooperable with said cam member to retain said service box in a selected one of said outward and said flush positions.

References Cited

UNITED STATES PATENTS 2,811,574 10/1957 Guerrero _____ 174—57
2,811,575 10/1957 Guerrero _____ 174—57

FOREIGN PATENTS 369,805 6/1963 Switzerland.

DARRELL L. CLAY, *Primary Examiner.*

D. A. TONE, *Assistant Examiner.*

U.S. Cl. X.R.

85—1; 339—34; 220—3.7